(12) United States Patent
Chang

(10) Patent No.: US 6,409,391 B1
(45) Date of Patent: Jun. 25, 2002

(54) FIBER OPTIC ILLUMINATION ADAPTOR ASSEMBLY FOR MULTIPLE LIGHT GUIDE CONNECTORS

(75) Inventor: David D. Chang, Encino, CA (US)

(73) Assignee: Cogent Light Technologies, Inc., Santa Clarita, CA (US)

( * ) Notice: Subject to any disclaimer, the term of this patent is extended or adjusted under 35 U.S.C. 154(b) by 0 days.

(21) Appl. No.: 09/532,300

(22) Filed: Mar. 22, 2000

Related U.S. Application Data

(60) Provisional application No. 60/126,335, filed on Mar. 26, 1999.

(51) Int. Cl.[7] ................................................. G02B 6/36
(52) U.S. Cl. ............................ 385/53; 385/55; 385/56; 385/60; 385/76; 385/77; 385/115; 385/139; 385/78
(58) Field of Search .............................. 385/53, 54, 55, 385/56, 58, 60, 62, 81, 76, 77, 115, 139, 78

(56) References Cited

U.S. PATENT DOCUMENTS

| | | | |
|---|---|---|---|
| 4,268,115 A | | 5/1981 | Slemon et al. ............. 385/53 X |
| 5,099,399 A | * | 3/1992 | Miller et al. ............... 385/53 X |
| 5,309,330 A | * | 5/1994 | Pillers et al. .............. 385/53 X |
| 5,315,683 A | * | 5/1994 | Miller ...................... 385/115 X |
| 5,329,604 A | | 7/1994 | Baldwin et al. ............... 385/93 |
| 5,640,478 A | | 6/1997 | Roller .......................... 385/92 |
| 5,717,806 A | * | 2/1998 | Pileski et al. ................ 385/117 |
| 5,761,356 A | | 6/1998 | Li ................................ 385/38 |
| 5,764,837 A | | 6/1998 | Roller .......................... 385/92 |
| 5,993,071 A | * | 11/1999 | Hultermans ................... 385/70 |

* cited by examiner

Primary Examiner—Brian Healy
(74) Attorney, Agent, or Firm—Rothwell, Figg, Ernst & Manbeck

(57) ABSTRACT

An adaptor assembly for coupling light guide connectors of varying configurations to a structure housing a source of focused light includes an internal adaptor having an internal optic guide element, a coupling structure, a housing, and a connector locking mechanism. The coupling structure can be inserted into and releasably retained within the structure housing the focused light. A light guide connector is inserted into a light guide receiving channel formed in the housing and is releasably retained therein by the connector locking mechanism. An internal optic guide element extends through the coupling structure to transmit focused light from the source of focused light to the light guide connector inserted into the connector-receiving channel. The housing includes heat dissipating elements to facilitate dissipation of heat generated at the interface between the optic guide element and the light guide of the connector. The adaptor assembly also includes a external adaptor having a body portion and an elongated insertion member. The elongated insertion member can be inserted into the connector-receiving channel of the internal adaptor, and the external adaptor can be releasably coupled to the internal adaptor by a releasable connecting mechanism. A short type of optical connector can be inserted into a connector-receiving cavity formed in the body portion of the external adaptor and releasably retained therein by a connector locking mechanism. Focused light from the light source is transmitted through the adaptor assembly by the first mentioned internal optic guide element of the internal adaptor and a second internal optic guide element disposed within the elongated insertion portion of the external adaptor.

15 Claims, 9 Drawing Sheets

FIBER OPTIC ILLUMINATION ADAPTOR ASSEMBLY FOR MULTIPLE LIGHT GUIDE CONNECTORS

This application claims the benefit of U.S. Provisional Application No. 60/126,335 filed Mar. 26, 1999, pending, the contents of which are hereby incorporated by reference.

FIELD OF THE INVENTION

This invention relate to an adaptor assembly which permits multiple light guide connectors of varying configurations to be optically coupled to a fiber optic illuminator.

BACKGROUND OF THE INVENTION

As shown in FIG. 1, a typical fiber optic illuminator system used in medical and industrial applications includes an optical light source system 2 having a light source 3 and an optical system 4 for collecting and focusing the light emitted by the light source. An illumination device 8, such as an endoscope, is connected to the light source system 2 via an optic fiber light guide 6 coupled to the light source system 2 by a proximal connector 5. The optic fiber light guide 6 may be a fiber optic bundle or a single optic fiber.

Historically, the proximal connector system 5 was designed to be compatible with only one type of optical light source system 2, resulting in various connectors being incompatible with other light source systems. To address the incompatibility problem, manufacturers of optical light source systems and illumination devices have developed adaptors for the various types of connectors that are commercially available.

Typical systems for adapting proximal connectors include a fixed adaptor, a turret adaptor, and a universal adaptor. In medical applications, for example, an illumination device such as that available from Karl Storz GmbH and Co. KG of Tuttlingen, Germany, has discrete output connectors that are each designed specifically for a particular type of fiber optic cable connector, such as a connector available from the Karl Storz Company. Illumination devices available from Luxtec Corporation of Worcester, Mass., incorporate a turret design with 4 ports, each of which is adapted to a particular commercially available fiber optic cable connector available from different manufacturers, namely, Karl Storz GmbH, Olympus, AccuMed International of Chicago, Ill. (ACMI), and Wolf. The turret adaptor is used by turning it to an appropriate position depending on which cable connector is being used. In another system available from Luxtec Corporation, the output connector system consists of a horizontal slide with three adapters for three different fiber optic cable connector systems. A third type of adaptor system available from Linvatec Corporation of Largo, Fla., involves a universal connector system with a chucking mechanism or a set screw that accepts various connectors.

Although all of these connector systems allow use of fiber optic connectors from various manufacturers, each system has its own disadvantages. For example, the turret system requires the user to find the right adapter port for the right connector, which is not always easy to identify, and the device is cumbersome to use. The sliding system has similar disadvantages. The chucking system and the set screw system both require the use of two hands for effecting the connection, and are also difficult to use.

Commercially available fiber bundle connectors are generally of two types: the long connectors, such as those available from Karl Storz GmbH and Olympus, and short connectors, such as those available from ACMI and Wolf. The commercially available connectors of other manufacturers generally fit into one or the other of these categories. Turrets are typically designed to account for the difference in length so as to position the end of the light guide within the connector at the focal point of the optical light source system.

In addition to fiber bundles, small diameter (<3 mm), single fiber optic light guides are commercially available from Cogent Light Technologies Incorporated of Santa Clarita, Calif. Because of their smaller size, these single fiber light guides have different alignment requirements compared to the light guides that incorporate fiber bundles and are generally not compatible with fiber bundles. Optimization for a single fiber does not necessarily optimize the system for fiber bundles. To make a light source compatible and optimized for use with both single fibers and fiber bundles requires both mechanical and optical improvements over the prior art.

Accordingly, there exists a need for an improved connector system adaptor for coupling the light of a single port of an optical light source system to either a single fiber or a fiber bundle light guide that accommodates the various commercially available connectors of varying physical configuration and achieves optimum results for light guides ranging from approximately 1 to 5 mm diameter.

SUMMARY OF THE INVENTION

The above-described need is addressed in accordance with the general principles of the present invention.

According to one aspect of the invention, an adaptor assembly is provided for coupling light guide connectors of varying configurations to a structure housing a source of focused light to be optically coupled into the light guide. The adaptor assembly includes an internal adaptor comprising an internal optic guide element, a coupling structure, a housing, and a connector locking mechanism.

The internal optic guide element has an input end and an output end. The coupling structure is constructed and arranged to be releasably coupled to the structure housing the source of focused light, and the internal optic guide element is disposed within the coupling structure with the input end thereof being exposed at an end of the coupling structure.

The housing extends from the coupling structure and includes heat dissipating elements formed thereon and a connector-receiving channel formed therein. The channel extends from an opening formed at one end of the housing and terminates proximate the output end of the internal optic guide element. The channel is constructed and arranged to receive a light guide connector inserted into the channel and to position the connector with respect to the output end of the internal optic guide element. The connector locking mechanism is attached to the housing and is constructed and arranged to operatively engage a light guide connector inserted into the channel and releasably hold the light guide connector within the channel.

According to another aspect of the invention, the adaptor assembly further includes an external adaptor comprising a second internal optic guide element, a body portion, an elongated insertion member, and a second connector locking mechanism.

The second internal optic guide element has an input end and an output end. The elongated insertion member extends from the body portion, and the second internal optic guide element is disposed within the insertion member with the input end thereof exposed at an end of the insertion member and the output end extending into the body portion. The elongated insertion member is constructed and arranged to be inserted into and received by the connector-receiving channel of the housing of the internal adaptor with the input end and of the second internal optic guide element disposed in close proximity to the output end of the first mentioned optic guide element of the internal adaptor. The body portion includes a releasable connecting mechanism constructed and arranged to engage a portion of the housing of the internal adaptor to releasably secure the body portion to the housing and thus secure the elongated insertion member within the connector-receiving channel. The body portion further includes a connector-receiving cavity formed therein that extends from an opening formed a tone end of the body portion and terminates proximate an output end of the second internal optic guide element. The second connector locking mechanism is disposed within the connector-receiving cavity and is constructed and arranged to operatively engage a light guide connector inserted into th e cavity and releasably lock the light guide connector inside said cavity.

Accordingly, long type light guide connectors of various configurations can be coupled to a focused light source by inserting the connector into the connector-receiving channel of the internal adaptor, which, in turn, is coupled to a structure housing a light source. Short type connectors of various configurations can be inserted into the connector-receiving cavity of the external adaptor, and the external adapter can be inserted into the connector-receiving channel of the internal adaptor which is coupled to the structure housing the focused light source.

Other objects, features, and characteristics of the present invention will become apparent upon consideration of the following description and the appended claims with reference to the accompanying drawings, all of which form a part of the specification.

DESCRIPTION OF THE DRAWINGS

Embodiments of the present invention will be described with reference to the attached drawings in which corresponding components or features in the various figures are designated by like reference numbers.

DETAILED DESCRIPTION

Figure 1:
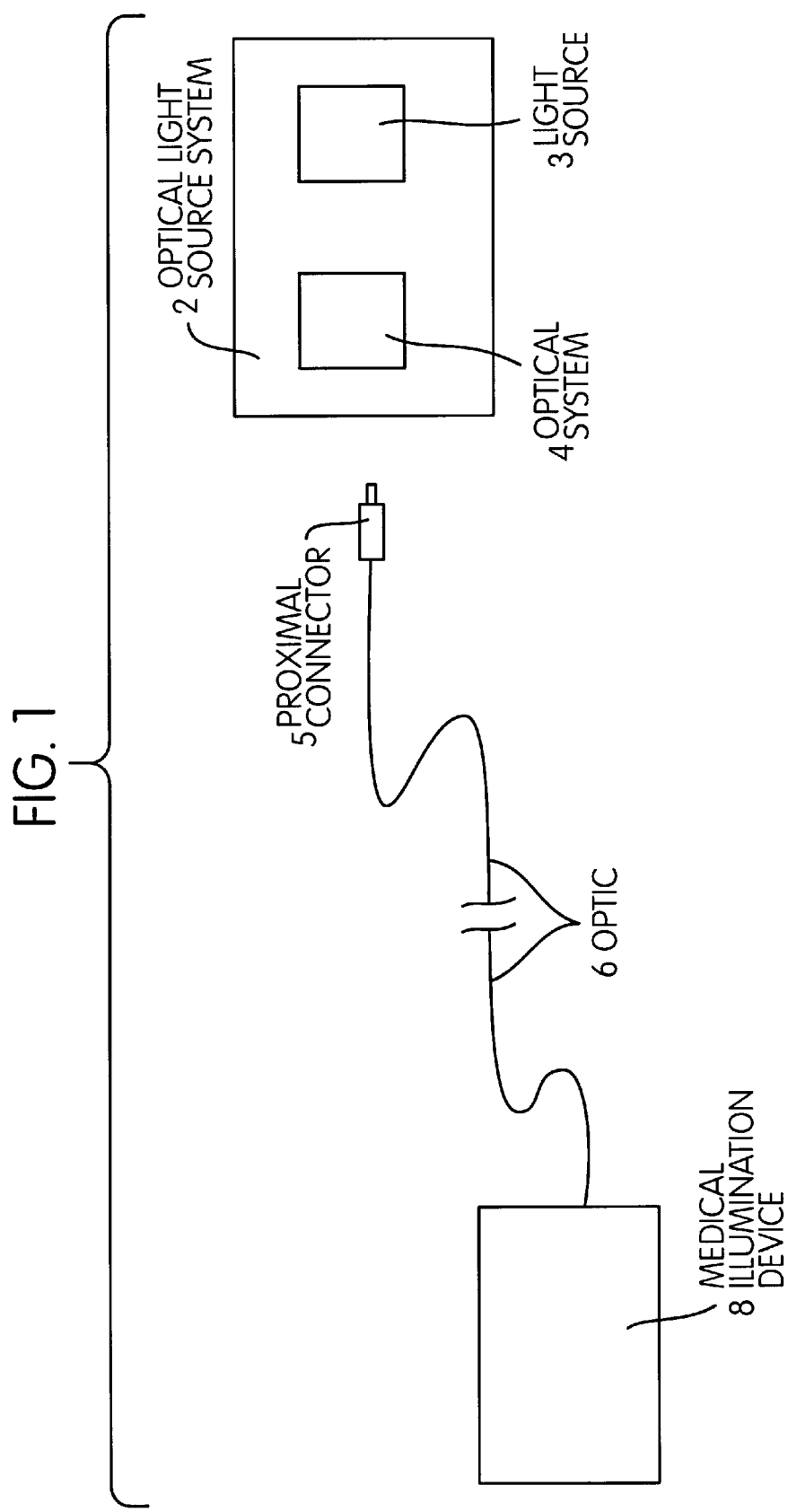
FIG. 1 is a block diagram illustrating a medical illumination system providing light from a light source system through an optic light guide into a medical illumination device.
Figure 2:
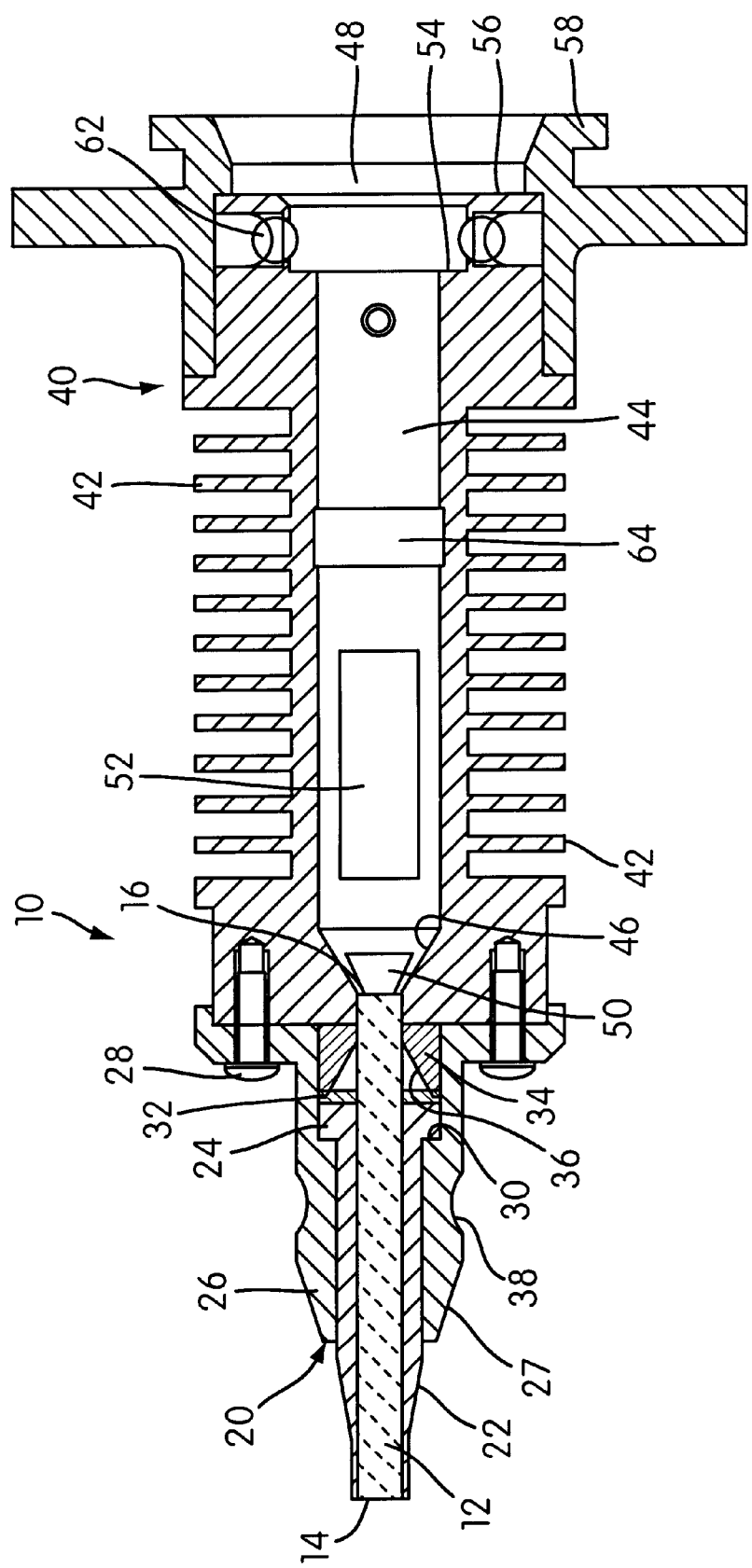
FIG. 2 is a side view, shown in cross-section, of an internal adaptor of the adaptor assembly according to the present invention.

An internal adaptor of an adaptor assembly according to the present invention is generally designated by reference number 10 in FIG. 2. The internal adaptor 10 includes a coupling structure 20 and a housing 40. The coupling structure 20 is constructed and arranged to be releasably coupled to the structure of the optical light source system 2 (see FIG. 1) housing the light source 3 and the optical system 4. In the illustrated embodiment, the coupling structure 20 includes a tapered ferrule 22 secured to the housing 40 by means of a ferrule retainer 26. In the preferred embodiment, the coupling structure, as embodied by the tapered ferrule 22 and the ferrule retainer 26, is constructed and arranged to be inserted into and releasably secured in a like-shaped receiving opening formed in the optical light source system, as is described in U.S. Pat. No. 5,640,478, the disclosure of which is hereby incorporated by reference.

The tapered ferrule 22 is hollow and has an enlarged end 24 and is mounted to the housing 40 by inserting the ferrule 22 through a hollowed portion of the ferrule retainer 26 until the enlarged end 24 engages an internal shoulder 30 formed inside the ferrule retainer 26. A retainer block 34 having a conical cavity 36 is inserted into the hollowed-out ferrule retainer 26 on top of the tapered ferrule 22 with a spacer 32 disposed between the block 34 and the enlarged end 24 of the ferrule 22. The assembly of the ferrule 22, the ferrule retainer 26, and the retainer block 34 is attached to the housing 40 by means of fasteners 28.

The ferrule retainer 26 includes a tapered portion 27 and a circumferential ring 38 formed in a cylindrical portion thereof. The coupling structure 22 can be inserted into an aperture (not shown) of the optical light source system 2 having a profile that is similar to that of the coupling structure 20. The ring 38 is engaged by a retaining device, such as a ball plunger spring-biasing mechanism (not shown) to releasably retain the coupling structure 20 in the housing of the optical light source system as is described in more detail in the aforementioned U.S. Pat. No. 5,640,478.

The tapered ferrule 22 is preferably formed from a material with high thermal conductivity such as metal, most preferably aluminum or stainless steel. The ferrule retainer 26 is preferably formed from a metal or a rigid plastic material.

An internal optic guide element 12 extends through the coupling structure 20 and has an input end 14 that is flush with a distal end of the tapered ferrule 22 and an output end 16 that projects beyond the retainer block 34 and into the housing 40. The internal optic guide element 12 may comprise a fused fiber bundle.

A connector-receiving channel 44 is formed in the housing 40 and extends from an opening 48 formed in an end (the right side in FIG. 2) of the housing 40 and terminates proximate the output end 16 of the internal optic guide element 12, which projects partially into the housing 40. The connector-receiving channel 44 includes a conically-shaped end surface 46 and has a stepped configuration at the right-hand side thereof which defines an annular shoulder 54 and an annular end face 56. The connector-receiving channel is constructed and arranged to receive therein a long-type fiber connector inserted through the opening 48 into the channel 44 and to position the connector with respect to the output end 16 of the internal optic guide element 12. Focused light provided by the optical light source system 2 will be coupled into the input end 14 of the internal optic guide element 12. The light will thereafter be transmitted toward the output end 16 of the guide element 12 and thereafter into the light guide of the connector inserted into the channel 44.

The internal optic guide element 12, which is preferably a rigid fused fiber bundle of high temperature material, serves as a spatial filter to prevent unguided modes of light from entering the input end of the connector inserted into the channel 44. Spatial filtering is described in more detail in U.S. Pat. No. 5,761,356, the disclosure of which is hereby incorporated by reference. The high temperature fused fiber bundle of the internal optic guide element 12 will isolate the lower temperature flexible fiber or fiber bundle typically employed in light guides of commercially available connectors from the intense heat of the focal point of high intensity light developed by the optical light source system 2, thereby preventing the flexible fibers from being damaged by the excessive heat. Furthermore, the fused fiber bundle acts as a spatial filter to eliminate light modes that cannot be guided by the output fiber light guide extending from the connector. Light modes that are filtered out will generate heat that is absorbed by the housing 40.

To assist in dissipating the heat absorbed by the housing 40, housing 40 includes heat dissipating elements, such as fins 42, formed thereon. The housing 40 is preferably formed from a material with high thermal conductivity, such as aluminum. Furthermore, openings 50 and 52 are formed through the walls of the housing and extend into the channel 44, thereby permitting air circulation around a connector inserted into the channel 44.

The internal adaptor 10 also includes a connector locking mechanism attached to the housing 40 and constructed and arranged to operatively engage a light guide connector inserted into the channel 44 and to releasably hold the light guide connector inside the channel 44. In the preferred embodiment, the connector locking mechanism includes radially-biased ball detents 62 and a circumferential ring 64 formed in the wall of the channel 44, the respective functions of which will be described in more detail below.

Figure 3:
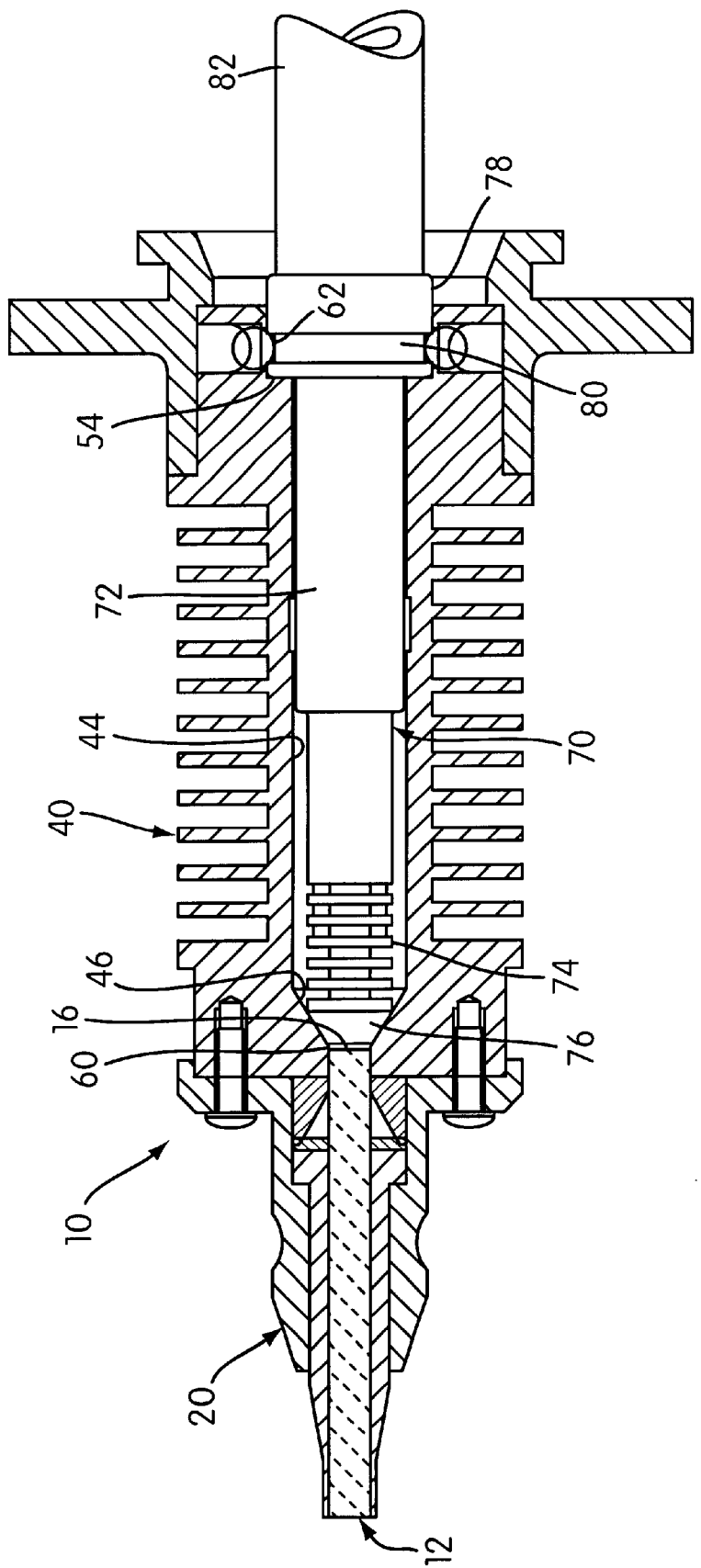
FIG. 3 is a side view, shown in partial cross-section, of the internal adaptor of the present invention with a first type of commercially available optical connector inserted therein.

FIG. 3 shows a long type light guide connector of the type commercially available from Cogent Light Technologies, Inc. of Santa Clarita, Calif., inserted into the internal adaptor 10. The connector 70 includes an elongated, axially-extending barrel 72 projecting from an enlarged diameter collar 78. The barrel 72 has a chamfered end 76 shaped so as to conform to the conical end surface 46 of the connector-receiving channel 44. The conforming surfaces of the chamfered end 76 and the conical end surface 46 promote better heat dissipation from the barrel 72 through the housing 40. Heat dissipating fins 74 are formed on the exterior of the barrel 72 near the chamfered end 76 in the vicinity of openings 50 and 52. The heat dissipating fins 74 are provided so as to promote more efficient heat dissipation from the connector 70. The light guide 82 is attached to and extends from the connector 70 from the collar 78. A peripheral groove 80 is formed in the collar 78. When the connector 70 is inserted into the channel 44, the ball detents 62 engage the groove 80, thereby retaining the connector 70 inside the channel 44. In addition to retaining the connector 70 inside the channel 44, the ball detents 62 are shaped so as to exert an axial force on the connector 70, thereby urging the chamfered end 76 into contact with the conical end surface 46. To remove the connector 70 from the channel 44, the holding force of the ball detents 62 can be overcome by pulling on the connector 70 with sufficient axial force. The barrel 72 of the connector 70 is preferably sized and configured so that a gap 60 is provided between the input end of the connector 70 and the output end 16 of the internal optic guide element 12. The gap 60 prevents direct contact between the optic guide element 12 and an optic guide in the connector 70, thereby limiting heat exchange between the two optic guides and avoiding damage caused by debris on the end surface of either guide.

Figure 4:
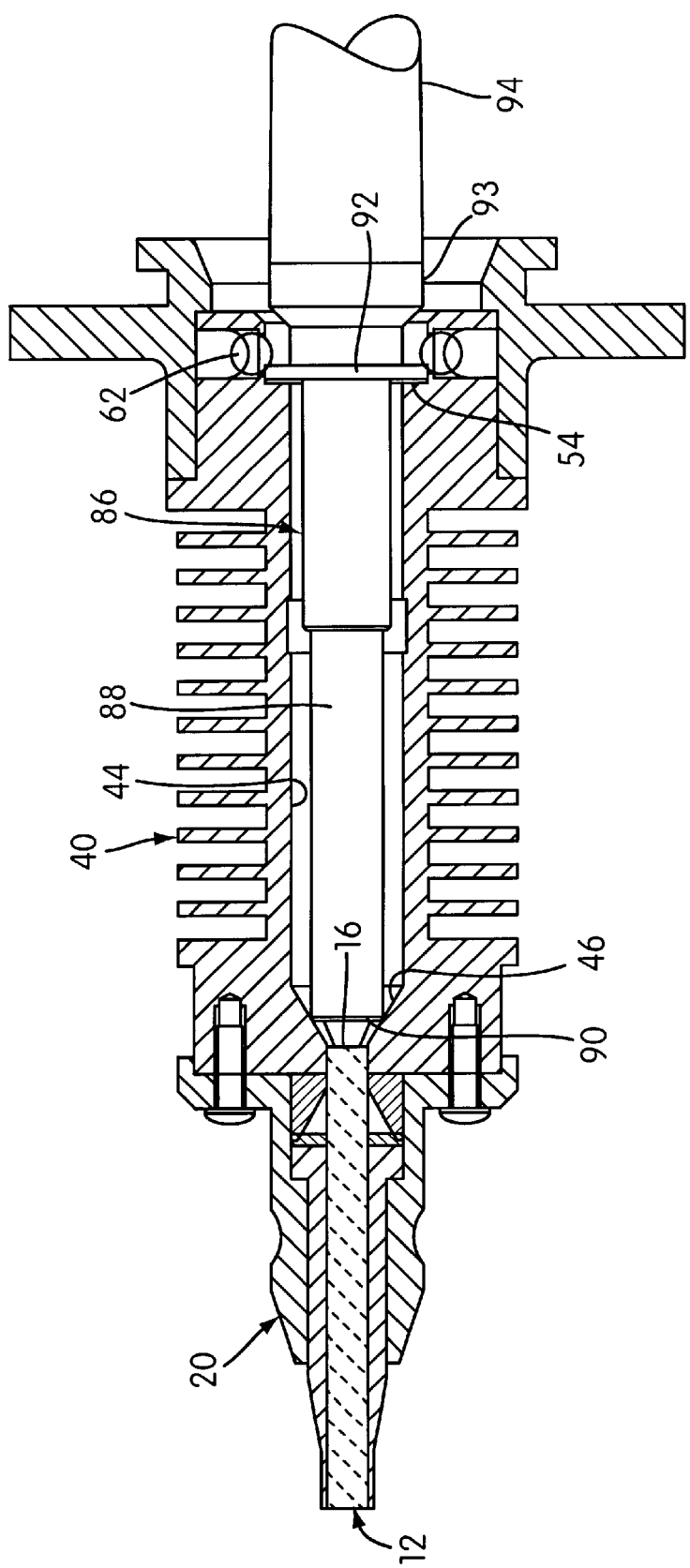
FIG. 4 is a side view, shown in partial cross-section, of the internal adaptor of the present invention with a second type of commercially available optical connector inserted therein.

FIG. 4 shows a long type light guide connector of the type commercially available from Karl Storz GmbH and Company KG of Germany inserted into the connector-receiving channel 44 of the internal adaptor 10. The Storz type connector 86 includes an elongated, axially-extending barrel 88 coupled, by means of a collar 93, to a light guide 94. The barrel 88 has a blunt end 90 which engages the conical end surface 46 of the channel 44, thereby centering the barrel 88 within the channel 44. An annular flange 92 projects radially from the base of the barrel 88 and is engaged by the ball detents 62 when the connector 86 is inserted into the channel 44. The ball detents 62 both retain the connector 86 within the channel 44 and exert an axial force on the connector 86, thereby urging the blunt end 90 into contact with the conical end surface 46.

Figure 5:
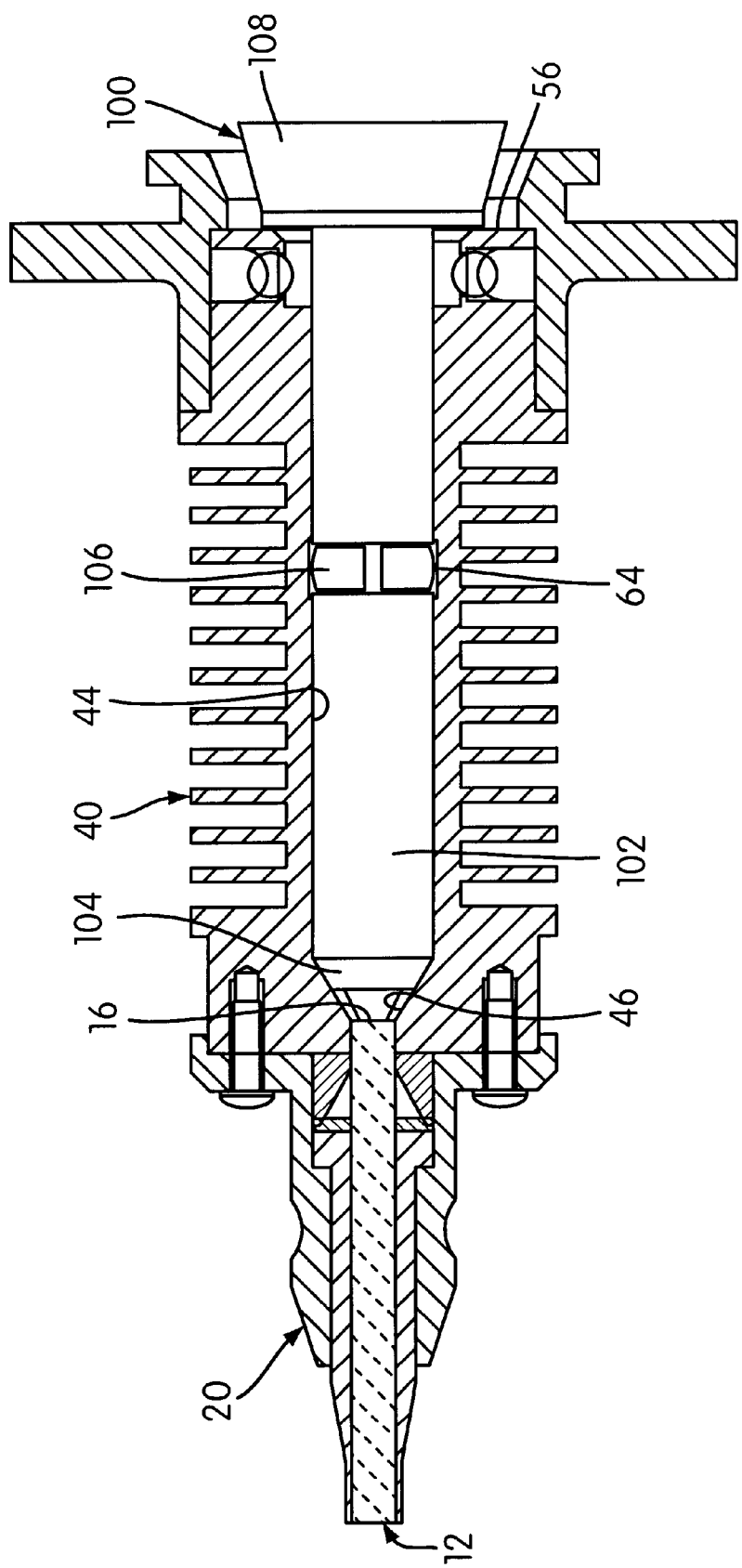
FIG. 5 is a side view, shown in partial cross-section, of the internal adaptor of the present invention with a third type of commercially available optical connector inserted therein.

FIG. 5 shows a long type light guide connector of a type commercially available from Olympus inserted into the connector-receiving channel 44 of the internal adaptor 10. The Olympus-type connector 100 includes an elongated, axially-extending barrel 102 projecting from a head 108. The input end of the barrel 102 includes a chamfered portion 104 for insertion into the channel 44. A radially-acting ring spring 106 is disposed on the barrel 102 and engages the circumferential ring 64 formed in the channel 44 when the connector 100 is inserted into the channel, thereby releasably holding the connector 100 within the channel 44. To remove the connector 100 from the channel 44, the holding force of the ring spring 106 can be overcome by pulling on the connector 100 with sufficient axial force.

Figure 6:
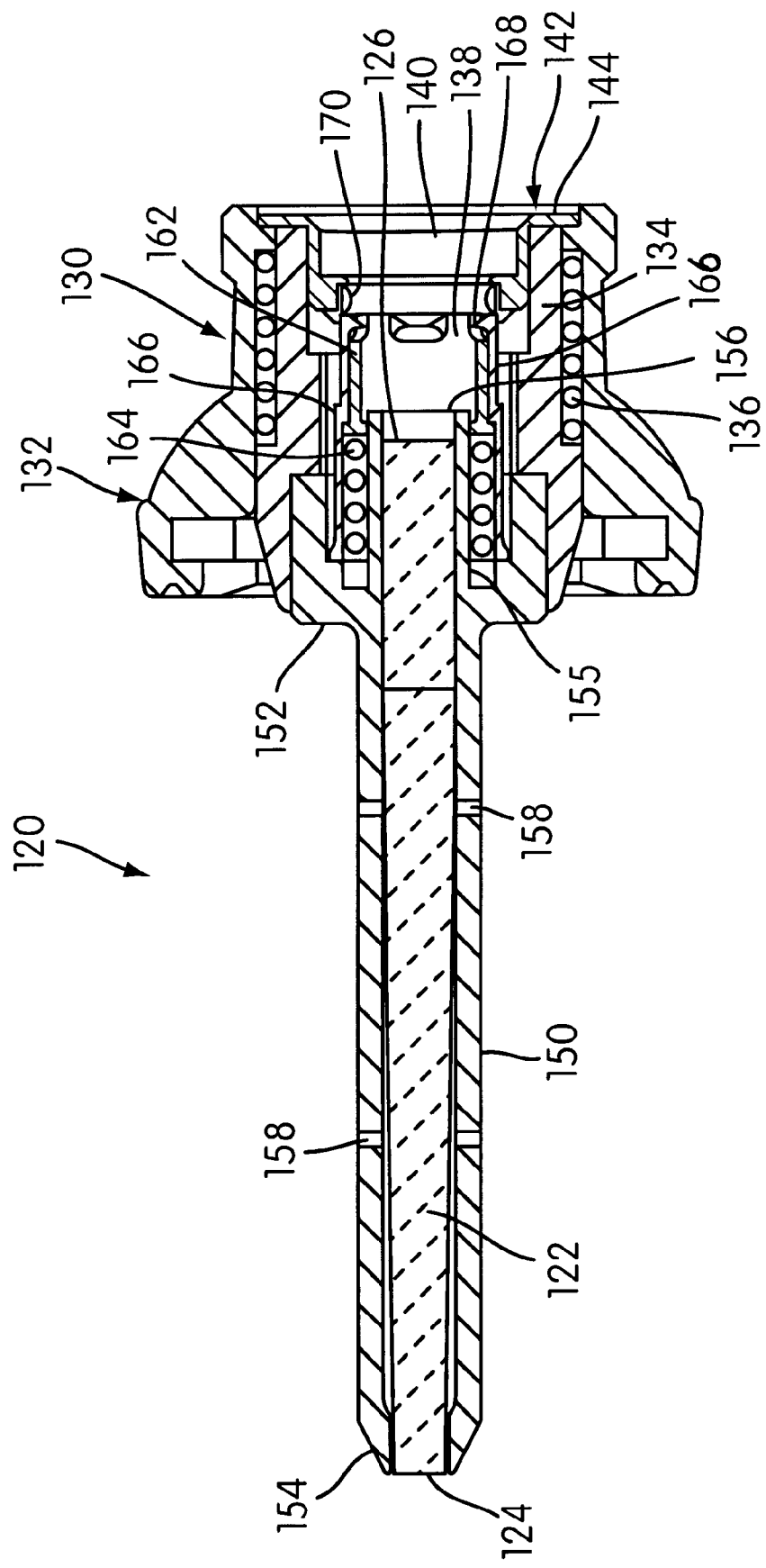
FIG. 6 is a side view, shown in cross-section, of an external adaptor according to the present invention.

FIG. 6 shows an external adaptor 120 of the adaptor assembly of the present invention. The external adaptor 120 includes a body portion 130 and an elongated insertion member 150 projecting from the body portion of 130. A second internal optic guide element 122 is disposed within the elongated insertion member 150. Optic guide element 122 has an input end 124 and an output end 126. In the preferred embodiment, the second internal optic guide element 122 is a tapered cladded rod. The insertion member 150 is preferably formed from material having a high thermal conductivity, such as aluminum. The insertion member 150 has a chamfered distal end 154 and a proximal end 156 disposed within the body portion 130 of the external adaptor 120. An enlarged portion of the insertion member 150 near its proximal end 156 extends into the body portion 130 and defines an annular end face 152. A plurality of radially-extending openings 158 are formed in the walls of the insertion member 150. The openings 158 are provided so as to permit the injection of epoxy into the member 150 for securing the second internal optic guide element 122.

The body portion 130 includes a releasable connecting mechanism 132, which, in the preferred embodiment, is a twist-and-lock collar. A housing 134 is disposed inside the body portion 130 with a spring 136 coaxially arranged between the housing 134 and the twist-and-lock collar 132.

A connector-receiving cavity 138 is centrally-formed within the body portion 130 and extends from a opening 140 formed in the body portion 130. The opening 140 is surrounded by an end fitting 142 inserted into the housing 134. The end fitting 144 defines a axially-facing annular shoulder 144. A sliding sleeve 162 surrounds the cavity 138. The sliding sleeve is substantially cylindrical and is sized so as to fit over a cylindrical projecting portion 155 of the insertion member 150. A retainer spring 164 surrounds the projecting portion 155 and urges the sliding sleeve 162 rearwardly (to the right in FIG. 6). An annular snap spring 166 surrounds the sliding sleeve 162 and has detents 168 that project radially inwardly. A split radial spring 170 is disposed in an annular groove formed in the end fitting 142.

Figure 7:
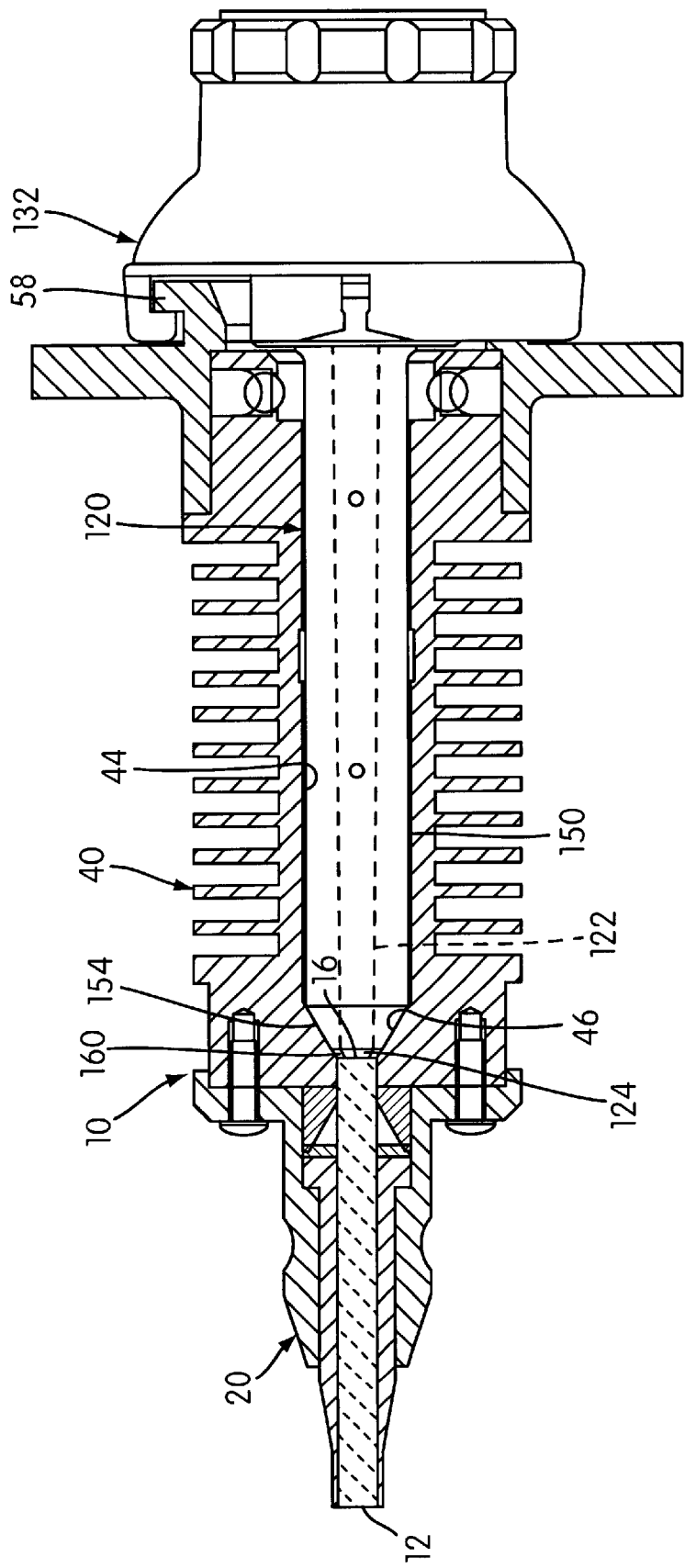
FIG. 7 is a side view, shown in partial cross-section, of the external adaptor of the present invention operatively inserted into the internal adaptor of the present invention.

FIG. 7 shows the external adaptor 120 operatively inserted into the internal adaptor 10 to form the adaptor assembly of the present invention. The insertion member 150 is received within the connector-receiving channel 44, and a chamfered distal end 154 of the insertion member 150 conforms to the conical end surface 46 of the channel 44. The releasable connecting mechanism 132 engages a flange 58 of the housing 40 in a twist-and-lock manner that is well known in the art so as to releasably secure the external adaptor 120 to the internal adaptor 10. A gap 160 is provided between the output end 16 of the internal optic guide element 12 of the internal adaptor 10 and the input end 124 of the second internal optic guide element 122 of the external adaptor 120. The gap 160 provides thermal isolation between the optic guide elements 12 and 122 and further prevents damage to the ends of the guide elements 12 and 122 by foreign debris disposed on the end surfaces.

When the external adaptor 120 is locked, via the connecting mechanism 132, into the internal adaptor 10, the spring 136 urges the housing 134 and the insertion member 150 axially into the connector-receiving channel 44 of the internal adaptor 10.

Figure 8:
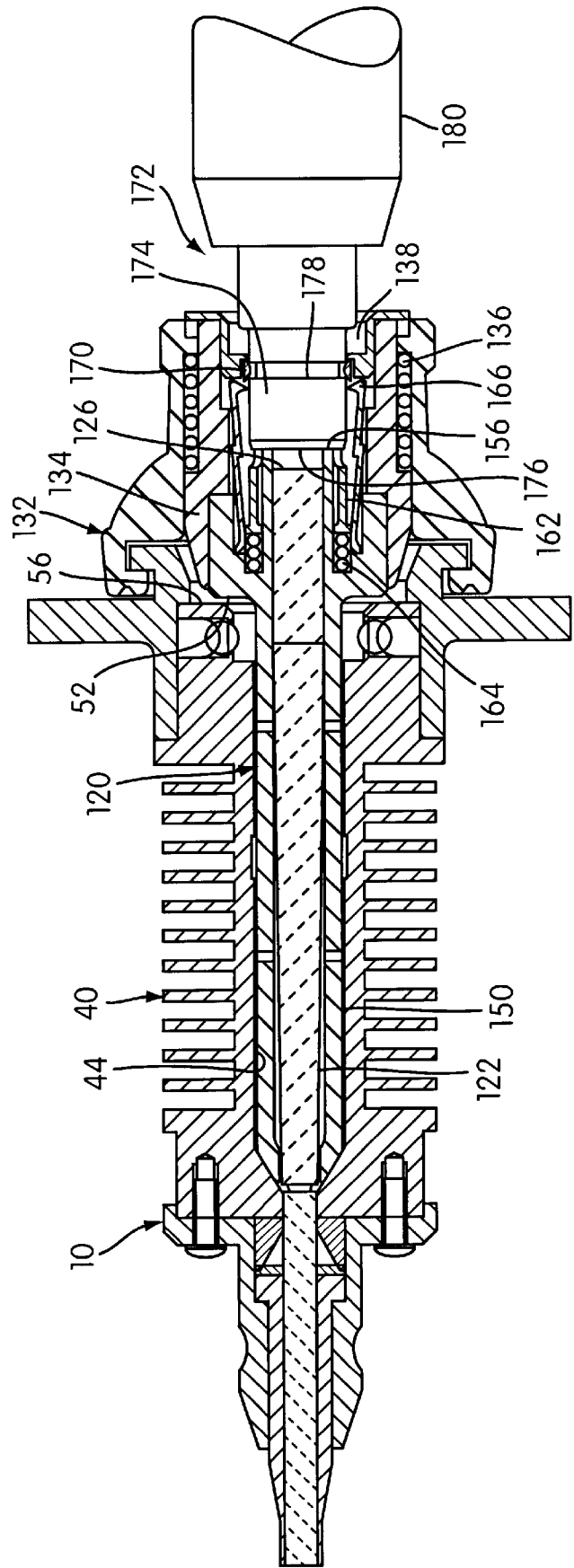
FIG. 8 is a side view, shown in partial cross-section, of an external adaptor of the present invention operatively inserted into an internal adaptor of the present invention, with a fourth type of commercially available optical connector inserted into the external adaptor.

FIG. 8 shows a short type optical connector 172, of the type commercially available from Wolf, inserted into an external adaptor 120 that in turn is inserted into an internal adaptor 10. The connector 172, attached to a light guide 180, is inserted into the connector-receiving cavity 138 formed in the body portion 130 of the external adaptor 120. The connector 172 has a cylindrical end portion 174 with an annular end face 176 that rests against the proximal end 156 of the insertion portion 150. The connector 172 has an outside diameter that is greater than that of the sliding sleeve 162 and therefore, pushes the sliding sleeve 162 against the spring bias of the retainer spring 164 to the left in FIG. 8. The connector 172 is retained in the cavity 138 by the split radial spring 170 engaging a circumferential groove 178 formed in the connector 172. To remove the connector 172 from the connector-receiving cavity 138, the holding force of the spring 170 can be overcome by pulling on the connector 172 with sufficient axial force.

There is preferably a gap between the output end 126 of the second internal optic guide element 122 and the proximal end 156 of the elongated insertion member 150. Accordingly, the input end of the light guide within the connector 172 does not contact the output end 126, thereby providing thermal isolation between the two light guide elements and also preventing damage to the relatively soft light guide within the connector 172, which can be caused by foreign debris disposed between the end faces of the coupled light guides.

Figure 9:
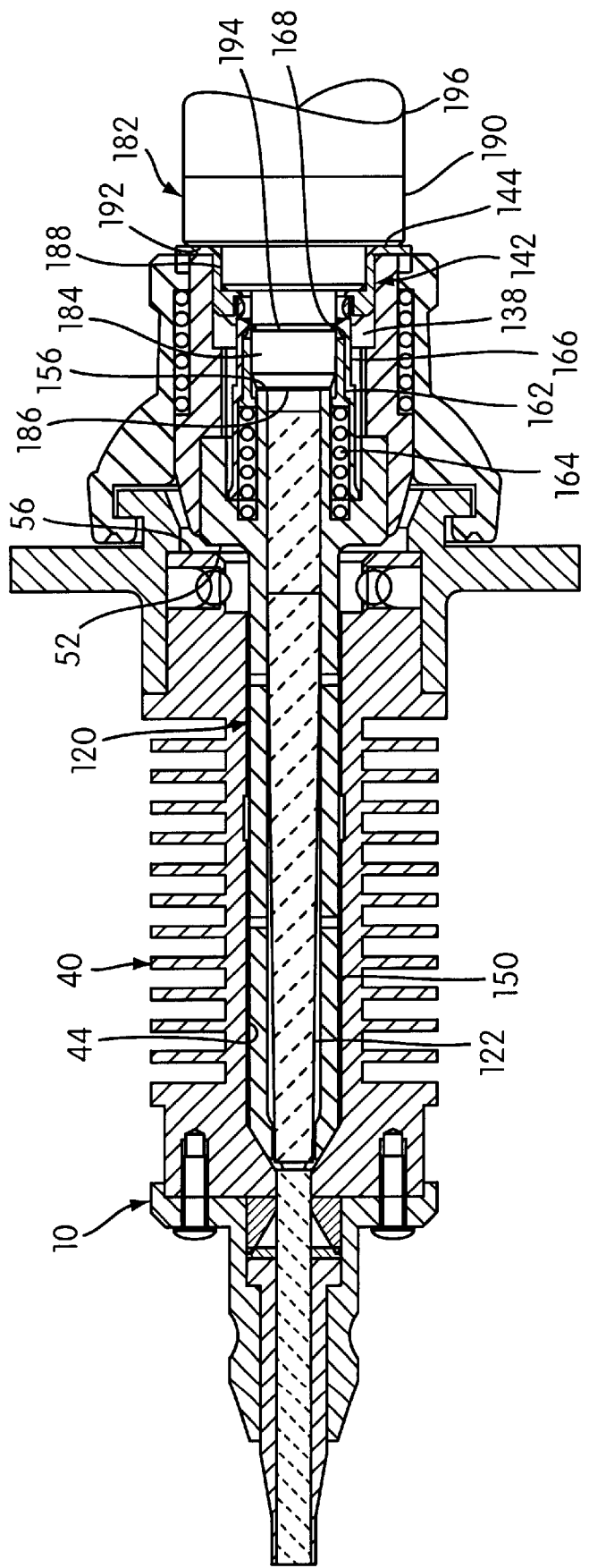
FIG. 9 is a side view, shown in partial cross-section, of the internal adaptor of the present invention with the external adaptor of the present invention operatively inserted therein and fifth type of commercially available optical connector inserted into the external adaptor.

FIG. 9 shows a short type optical connector 182 of the type commercially available from ACMI inserted into an external adaptor 120 that in turn is inserted into an internal adaptor 10. The connector 182 has a cylindrical end portion 184 having an annular end face 186 that contacts the proximal end 156 of the insertion member 150. The diameter of the cylindrical portion 184 is less than that of the sliding sleeve 162. Therefore, the end portion 184 slides inside and is guided by the sliding sleeve 162 when the connector 182 is inserted into the connector-receiving cavity 138. The connector 182 is retained within the cavity 138 by the detents 168 of the snap spring 166 which engage a circumferential groove 194 formed about the cylindrical portion 184 of the connector 182. The holding force of the detents 168 can be overcome by pulling on the connector 182 with sufficient axial force. An enlarged cylindrical portion 188 of the connector 182 fits within an opening defined by the end fitting 142, and a further enlarged cylindrical portion 190 defines an annular shoulder 194 that engages the annular shoulder 144 of the end fitting 142.

While the invention has been described in connection with what are presently considered to be the most practical and preferred embodiments, it is to be understood that the invention is not to be limited to the disclosed embodiments, but, on the contrary, it is intended to cover various modifications and equivalent arrangements included within the spirit and scope of the appended claims. Thus, it is to be understood that variations in the particular parameters used in defining the present invention can be made without departing from the novel aspects of this invention as defined in the following claims.

What is claimed is:

1. An adaptor assembly for coupling light guide connectors of varying conjurations to a structure housing a source of focused light to be optically coupled into the light guide, said adaptor assembly including an internal adaptor comprising:

an internal optic guide element having an input end and an output end;

coupling structure constructed and arranged to be releasably coupled to the structure housing the source of focused light, said internal optic guide element being disposed within said coupling structure with said input end thereof being exposed at an end of said coupling structure;

a housing extending from said coupling structure, said housing including heat dissipating elements formed thereon and a connector-receiving channel formed therein, said channel extending from an opening formed at one end of said housing and terminating proximate said output end of said internal optic guide element and being constructed and arranged to receive a light guide connector inserted into said channel and to position the connector with respect to said output end of said internal optic guide element; and a connector locking mechanism attached to said housing and constructed and arranged to operatively engage a light guide connector inserted into said channel and releasably hold said light guide connector within said channel.

2. The adaptor assembly of claim 1, wherein said connector locking mechanism comprises radially biased ball detents constructed and arranged to engage a groove or a flange formed on the light guide connector.

3. The adaptor assembly of claim 1, wherein said connector locking mechanism comprises a groove formed in an internal wall of said channel and adapted to receive a spring ring formed on the light guide connector.

4. The adaptor assembly of claim 1, wherein said channel wall includes a conical end surface formed near said output end of said internal optic guide element.

5. The adaptor assembly of claim 1, wherein said heat dissipating elements comprise heat fins formed on an exterior surface of said housing.

6. The adaptor assembly of claim 1, wherein openings are formed in said housing which communicate with said connector-receiving channel to permit air circulation around a connector received within said channel.

7. The adaptor assembly of claim 1, wherein said coupling structure comprises a tapered ferrule.

8. The adaptor assembly of claim 1, wherein said internal optic guide element comprises a fused fiber bundle.

9. The adaptor assembly of claim 1, wherein said internal optic guide element comprises a fiber bundle of at least 3 mm diameter.

10. The adaptor assembly of claim 1, wherein said internal optic guide element comprises a one of a cladded rod, a tapered fused fiber bundle, or a tapered cladded rod.

11. The adaptor assembly of claim 1, further including an external adaptor comprising:
    a second internal optic guide element having an input end and an output end;
    a body portion;
    an elongated insertion member extending from said body portion, said second internal optic guide element being disposed within said insertion- member with said input end thereof exposed at an end of said insertion member and said output end extending into said body portion, said elongated insertion member being constructed and arranged to be inserted into and received by said connector-receiving channel of said housing of said internal adaptor with said input and of said second internal optic guide element disposed in close proximity to said output end of said first mentioned optic guide element of said internal adaptor, said body portion including a releasable connecting mechanism constructed and arranged to engage a portion of said housing of said internal adaptor to releasably secure said body portion to said housing and thus secure said elongated insertion member within said connector-receiving channel, said body portion further including a connector-receiving cavity formed therein, said cavity extending from an opening formed at one end of said body portion and terminating proximate an output end of said second internal optic guide element; and
    a second connector locking mechanism disposed within said connector-receiving cavity and constructed and arranged to operatively engage a light guide connector inserted into said cavity and releasably lock said light guide connector inside said cavity.

12. The adaptor assembly of claim 11, wherein said releasable connecting mechanism of said body portion of said external adaptor comprises a twist-and-lock collar that engages a flange formed on said housing of said internal adaptor.

13. The adaptor assembly of claim 11, wherein said second connector locking mechanism comprises a split radial spring disposed in a groove formed about said connector-receiving cavity and constructed and arranged to lockingly engage a peripheral groove formed on a light guide connector inserted into said cavity.

14. The adaptor assembly of claim 11, wherein said second connector locking mechanism comprises a snap spring with detents disposed within said connector-receiving cavity, said detents being constructed and arranged to lockingly engage a peripheral groove for med on a light guide connector inserted into said cavity.

15. An-adaptor assembly for receiving light guide connectors of varying configurations, comprising:
    an external adaptor, said external adaptor comprising:
    an internal optic guide element having an input end and an output end;
    a body portion;
    an elongated insertion member extending from said body portion, said internal optic guide element being disposed within said insertion member with said input end thereof exposed at an end of said insertion member and said output end extending into said body portion, said body portion further including a connector-receiving cavity formed therein, said cavity extended from an opening formed at one end of said body portion and terminating proximate said output end of said internal optic guide element;
    a connector locking mechanism disposed within said connector-receiving cavity and constructed and arranged to operatively engage a light guide connector inserted into said cavity and releasably lock said light guide connector inside said cavity; and
    an internal adaptor for coupling said external adaptor to a structure housing a source of focused light, said internal adaptor comprising:
    a second internal optic guide element having an input end and an output end;
    coupling structure constructed and arranged to be releasably coupled to the structure housing the source of focused light, said second internal optic guide element being disposed within said coupling structure with said input end thereof being exposed an end of said coupling structure; and
    a housing extending from said coupling structure, said housing including heat dissipating elements formed thereon and a connector-receiving channel formed therein, said channel extending from an opening formed at one end of said housing and terminating proximate said output end of said second internal optic guide element and being constructed and arranged to receive said elongated insertion member of said external adaptor inserted into said channel and to position the input end of said internal optic guide element within said insertion member in operative proximity with respect to said output end of said second internal optic guide element,
    wherein said body portion of said external adaptor includes a releasable connecting mechanism constructed and arranged to engage a portion of said housing of said internal adaptor to releasably secure said body portion to said housing and thus secure said elongated insertion member within said connector-receiving channel.

* * * * *